Nov. 11, 1930. M. WINTERHALTER Re. 17,865

FASTENING FOR WEARING APPAREL AND THE LIKE

Original Filed Aug. 15, 1925

INVENTOR.
M. Winterhalter
BY Marks and Clerk
ATTORNEYS.

Reissued Nov. 11, 1930

Re. 17,865

UNITED STATES PATENT OFFICE

MARTIN WINTERHALTER, OF HALLE-ON-THE-SAALE, GERMANY, ASSIGNOR, BY MESNE ASSIGNMENTS, TO MISHAWAKA RUBBER & WOOLEN MANUFACTURING COMPANY, OF MISHAWAKA, INDIANA, A CORPORATION OF INDIANA

FASTENING FOR WEARING APPAREL AND THE LIKE

Original No. 1,610,839, dated December 14, 1926, Serial No. 50,508, filed August 15, 1925, and in Germany November 25, 1924. Application for reissue filed February 26, 1927. Serial No. 171,755.

This invention relates to a fastening for wearing apparel and the like and of the kind in which staggered rows of fastening members are connected to the edges to be joined and drawn into interlocking position by means of a slide.

In known fastenings of this kind, the interlocking elements are either spherical or elongated. The spherical elements have the advantage that they can be drawn together with little friction and from any direction, but, as they allow a pivotal relative adjustment of the members and as the slide requires them to be in parallel planes when the fastening is opened, a rectification of the position must take place which often renders the opening process very troublesome. The elongated interlocking elements retain the members in their correct position relative to the slide, but they must be drawn together either in longitudinal or transverse direction. This requires in both instances a bending of the edges to which considerable resistance is offered when said edges, as in the case of tents for instance, are in tension.

The principal objects of my invention are to provide simple and effective means for preventing relative pivotal displacement of the interlocked fastener members; to divide the projections and recesses or to separate portions thereof so as to provide an interengagement for opposing such displacement; and to provide spherical interlocking elements with ribs and grooves or other suitable matching indentations and projections for this purpose. My invention also seeks to produce a fastening whose members can be brought together from any direction and which at the same time are prevented, when in engagement, from pivotal relative displacement, and includes a slide adapted to draw together and separate the fastener members by a combined relative endwise and sidewise movement of the members or a movement in a direction which lies between the longitudinal and the transverse direction of the members. By this arrangement the bending of the edges is reduced to a minimum, and the fastening members can be drawn together and disconnected with the least possible friction.

Fig. 1 of the accompanying drawings represents a view of the improved fastening showing the slide in operation.

The edges *b* of sheets of fabric, leather or the like are connected in known manner by means of staggered rows of interlocking fastening members *a* which are drawn together by means of a slide *c*. The fastening members interlock by means of heads formed so as to present a spherical projection *e* and at the other side a spherical cavity *d*, the projection of one member being adapted to engage the cavity of the adjacent member. According to the invention the projections and cavities are formed with auxiliary interlocking means for holding the interengaged elements against relative pivotal movement about an axis concentric with the projections and cavities and running lengthwise of the fastener, this being accomplished in the illustrated structure by forming the projection *e* with a groove *g*, and the cavity with a corresponding rib *f*, which interengage and prevent relative pivotal displacement about the center of the spherical surfaces. By making the projection *e* and cavity *a* of spherical form a portion of the element *a* adjacent the outer end has a transversely arched form and the groove *g* and rib *f* divide this transversely arched portion substantially midway between the lateral edges of the element. The groove *g* which extends lengthwise of the element is preferably of substantially V-shaped form in cross section with oppositely inclined side faces so that the ribs *f* will readily enter and seat therein and this groove in the interlocking operation serves to guide the opposed element over the projection to the interlocked position.

It is preferred to groove the projection as this avoids the increased elevation that would be occasioned by using a rib on the projection in place of the groove *g*, and moreover, by the grooving of the projection, the latter is divided or separated into two portions or substantially a pair of projections which engage in the corresponding pair of depressions which are formed by the rib *f* in the depression *d* and this sort of two point interengagement of the interengaged members effectively prevents relative pivotal displacement thereof. Auxiliary depressions and projections of other form than the ribs *f* and grooves *g* may also be used as it will be readily apparent to accomplish the keying of the interlocked members against relative pivotal displacement. The fastening members will thus be retained in their correct position relative to the slide *c*.

Figure 1:
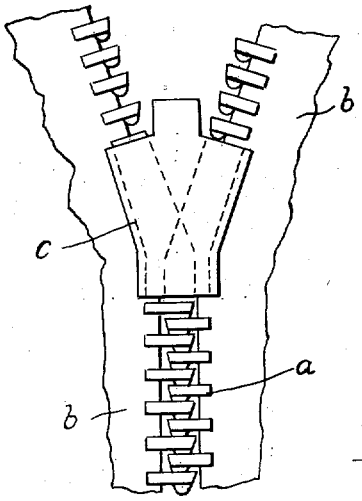
Figure 6:
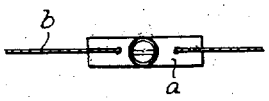
Fig. 6 is a horizontal sectional view of the interlocked fastener of Fig. 1.
Figure 4:
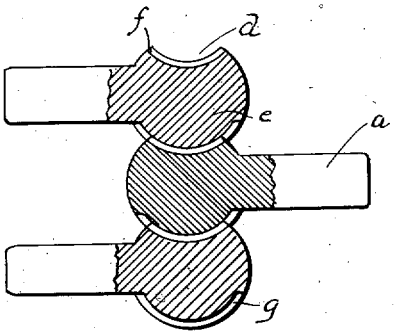
Fig. 4 is a sectional view of a fastening of modified construction.
Figure 2:
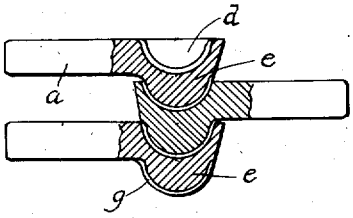
Fig. 2 is a sectional view of the fastening on an enlarged scale.
Figure 3:
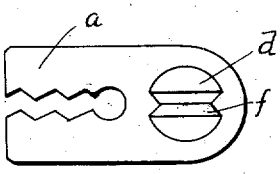
Fig. 3 is a plan of the recessed side of one of the fastening members.
Figure 5:
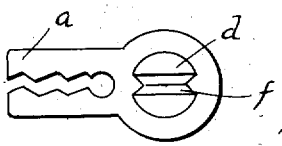
Fig. 5 is a plan of the recessed side of one of the fastening members of this construction.

The spherical surfaces may be incomplete or substantially hemispherical as shown in Figs. 1, 2 and 3 or they may be extended so as to form the head into a complete sphere or substantially ball shaped end portion only interrupted by the cavity *d* as in Figs. 4 and 5. The spherical depression *d* and projection *e* afford a substantially circular interlocking portion which is lune shaped in section lengthwise of the element and the larger arc or surface of the projection has a sliding joint bearing in the smaller arc or recess of the next adjacent member. The groove *g* provides an auxiliary seat which is diametrically arranged with respect to this said circular interlocking portion and the rib *f* on the other side is correspondingly arranged. The heads are shaped so as to maintain, between the bodies of adjacent members, a free space which is substantially equal to the head diameter, as shown in Fig. 4.

Figure 8:
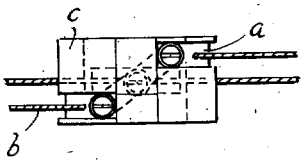
Fig. 8 shows the same thing in connection with the slide.
Figure 7:
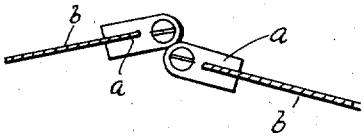
Fig. 7 shows the manner in which the fastening members are drawn together.

To obviate excessive bending of the edges *b*, the fastening members are brought together in an oblique direction, that is, by a combined relative endwise and sidewise movement and at an angle lying between the longitudinal and the transverse direction of the members. For this purpose the guide channels in the slide *c* are carried from a coinciding position in which they lie in the same plane at the narrow end of the slide towards diagonally opposite corners at the wide end and swing respectively at opposite sides of said plane, so that the fastening members will approach each other along a straight line from the position shown by full lines in Fig. 8 to the position shown by dotted lines.

I claim:

1. A fastening for wearing apparel and the like comprising staggered rows of fastening members connected to the edges to be joined and adapted to mesh and interlock, each member being formed with interlocking means in the form of a spherical head and with a semi-spherical recess in said head, the heads being formed with intermeshing ribs and grooves which break the continuity of the spherical surfaces of said head and recess so as to prevent pivotal relative displacement of the members, and a slide for guiding the members successively into and out of engagement with each other.

2. A fastening according to claim 1 in which the heads are shaped so as to maintain between the bodies of adjacent members a free space which is substantially equal to the head diameter.

3. A fastening according to claim 1 in which the slide is formed with channels in which the fastening members are guided, said channels being carried from a coinciding position at one end of the slide towards diagonally opposite corners at the other end of the slide, so as to bring the fastening members together at an angle lying between the longitudinal and the transverse direction of the same.

4. In a fastening device of the class described, the combination of opposed series of fastener elements and a slider operable therealong for interlocking and releasing same, said elements having projections and recesses in opposite sides respectively thereof for interlocking the two series of elements, and said projections and recesses being formed with auxiliary interlocking means to prevent the projection turning in the recess with which it is engaged around a longitudinal axis of the fastening device.

5. In a fastening device of the class described, the combination of opposed series of fastener elements and a slider operable therealong for interlocking and releasing same, each of said elements having on one side a projecting portion round in cross section and a corresponding recessed portion in the other side to engage respectively with a recessed portion and a projecting portion of adjoining elements of the opposed series for interlocking the two series of elements, and said portions being provided respectively with auxiliary recesses and projections which interengage so as to prevent pivoting of the fastener elements of one series about the longitudinal axis of the other series of fastener elements.

6. In a fastening device of the class described, the combination of opposed series of fastener elements and a slider operable therealong for interlocking and releasing same, each of said elements comprising an elongated substantially flat plate having mounting means at one end and having at the other end a projection on one side spaced from the lateral edges of the element and a recess in the other side which said projection and recess engage respectively with a recess and a projection of adjoining elements of the opposed series to interlock the opposed elements against separation, and auxiliary interlocking means on the opposed elements which interengage and hold the opposed elements against relative pivotal movement around an axis running lengthwise of the series of fastener elements.

7. In a fastening device of the class described, the combination of a fastener element having mounting means at one end and having at the other end a divided projection on one side and a correspondingly divided recess in the other side.

8. In a fastening device of the class described, the combination of a fastener element having mounting means at one end and having at the other end a transversely arched portion with a rib at one side and a groove at the other side of the element dividing the transversely arched portion substantially midway between the lateral edges of the element.

9. In a fastening device of the class described, the combination of opposed series of fastener elements and a slider operable therealong for interlocking and releasing same, each of said elements having a substantially ball-shaped end portion with a recess in one side.

10. In a fastening device of the class described, the combination of a fastener element having means at one end for mounting on a stringer and said element being formed at the other end with a depressed portion on one side and a projecting portion at the other side, both the depressed and projecting portions being spaced from the lateral edges and the end of the element, and a transverse rib on one of said portions and a transverse groove in the other of said portions.

11. In a fastening device of the class described, the combination of a fastener element having means at one end for mounting on a stringer and said element being formed at the other end with a depression in one side and a projection on the other side, said depression and projection being circular in cross section, the former having a diametrical rib and the latter having a diametrical groove.

12. In a fastening device of the class described, the combination of a fastener element having means at one end for mounting on a stringer and said element being formed at the other end with a substantially hemispherical offset portion at one side and a substantially hemispherical recess in the other side, and said offset portion having a transverse groove and said recess having a transverse rib.

13. In a fastening device of the class described, the combination of opposed series of fastener elements and a slider operable therealong for interlocking and releasing same, said elements having main interlocking portions of substantially circular form in cross section which interengage to lock the elements against direct separation, and auxiliary interengaging means on the opposed elements which interlock and thereby hold the opposed elements against relative pivotal movement around an axis concentric with the main interlocking portions and extending lengthwise of the series of fastener elements.

14. In a fastening device of the class described the combination of opposed series of elongated fastener elements and a slider operable therealong for interlocking and releasing same, each of said elements being formed with mounting means at the outer end thereof and having at the inner end a longitudinally extending groove at one side and a longitudinally extending rib at the other side, and means extending laterally from the rib and groove for interlocking the elements of the two series against direct separation.

15. In a device of the class described, a double series of fastening members and means for attachment thereof to a piece of material, each of said members being lune shaped in longitudinal section, and the larger arc of each of said members having a sliding joint bearing in the smaller arc of the next adjacent member when said members are in interlocking position.

DR. MARTIN WINTERHALTER.